(12) United States Patent
Blagsvedt et al.

(10) Patent No.: US 7,730,134 B2
(45) Date of Patent: *Jun. 1, 2010

(54) CONTACT SIDEBAR TILE

(75) Inventors: Sean O. Blagsvedt, Seattle, WA (US); Ahsan S. Kabir, Seattle, WA (US); Roman L. Deeds, Olympia, WA (US); Peyman Oreizy, Kirkland, WA (US); Cornelius K. Van Dok, Bellevue, WA (US); Kevin M. Otnes, Bothell, WA (US); Mark Schofield, Redmond, WA (US); Colin R. Anthony, Kirkland, WA (US); Christopher J. Araman, Seattle, WA (US)

(73) Assignee: Workman Nydegger, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/246,362

(22) Filed: Oct. 6, 2008

(65) Prior Publication Data

US 2009/0030998 A1    Jan. 29, 2009

Related U.S. Application Data

(63) Continuation of application No. 10/683,800, filed on Oct. 10, 2003, now Pat. No. 7,433,920.

(51) Int. Cl.
*G06F 15/16*    (2006.01)
(52) U.S. Cl. .................... 709/204; 709/206; 709/248; 715/733; 715/734; 715/735; 715/736; 715/737; 715/738; 715/739; 715/740; 715/741; 715/742; 715/743; 715/744; 715/745; 715/746; 715/747; 715/748; 715/749; 715/750; 715/751; 715/752; 715/753; 715/754; 715/755; 715/756; 715/757; 715/758; 715/759

(58) Field of Classification Search ................. 709/204, 709/206, 248; 715/733–759
See application file for complete search history.

(56) References Cited

U.S. PATENT DOCUMENTS 5,727,950 A    3/1998    Cook (Continued)

FOREIGN PATENT DOCUMENTS

JP    10023134    1/1998

(Continued)

OTHER PUBLICATIONS

Whitfield, Nigel; "Instant Messaging" Personal Computer Worls; Aug. 2002; vol. 25, No. 8; p. 135-140, 143-145, 148, 151-152.

(Continued)

*Primary Examiner*—Yves Dalencourt
*Assistant Examiner*—Michael C Lai

(57) ABSTRACT

Methods, systems, and computer program products for tracking real-time communication data within a single contact tracking application for diverse communication providers and applications. A global data store is synchronized with real-time communication data, such as presence, status, unread messages, and unread notifications, from each application/provider. Real-time communication data for contacts dynamically determined to be recent contacts is retrieved from the data store, based on properties such as a most recent communication time, a communication count, and the like. Real-time communication data corresponding to contacts identified as pinned contacts for which display of real-time communication data is preferred, also may be retrieved. A user interface is generated for displaying the one or more recent and/or pinned contacts, which may vary in size based on the number of contacts identified as pinned contacts, from which a contact may be selected for real-time conversation or e-mail.

28 Claims, 7 Drawing Sheets

U.S. PATENT DOCUMENTS

| | | | | |
|---|---|---|---|---|
| 5,951,638 | A | 9/1999 | Hoss | |
| 6,247,043 | B1 | 6/2001 | Bates | |
| 6,411,685 | B1 | 6/2002 | O'Neal | |
| 6,430,604 | B1 | 8/2002 | Ogle | |
| 6,519,639 | B1 | 2/2003 | Glasser | |
| 6,549,937 | B1 | 4/2003 | Auerbach | |
| 6,714,965 | B2 * | 3/2004 | Kakuta et al. | 709/204 |
| 6,976,092 | B1 * | 12/2005 | Daniell et al. | 709/246 |
| 2002/0070963 | A1 * | 6/2002 | Odero et al. | 345/739 |
| 2003/0046296 | A1 | 3/2003 | Doss et al. | |
| 2004/0172455 | A1 * | 9/2004 | Green et al. | 709/207 |
| 2004/0235520 | A1 * | 11/2004 | Cadiz et al. | 455/557 |

FOREIGN PATENT DOCUMENTS

| | | |
|---|---|---|
| JP | 2000286950 | 10/2000 |
| JP | 2001274875 | 10/2001 |
| JP | 2001333193 | 11/2001 |
| JP | 2003188979 | 7/2003 |
| WO | 0069140 | 11/2000 |
| WO | 0167363 | 1/2001 |

OTHER PUBLICATIONS

Faure, C.; Presence Service in 3G Networks; Third International Conference on 3G Mobile Communication Technologies; May 8-10, 2002; London, UK; p. 511-515.

Kanter, Theo G.; "Extensible Mobile Presence"; 2002 4th International Workshop on Mobile and Wireless Communications Network (Cat. No. 02EX614); Sep. 9-11, 2002; Stockholm, Sweden; p. 661-4.

Opening Presence; Telephony; Nov. 4, 2002; vol. 243, No. 14; p. 36-41.

Cherry, Steven M.; "IM Means Business"; IEEE Spectrum; Nov. 2002; vol. 39, No. 11; p. 28-32.

Cutrell, Edward~ Czerwinski, Mary; Horvitz, Eric L.; "Notification, Disruption, and Memory: Effects of Messaging Interruptions on Memory and Performance"; Interaction International Conference on Human-Computer Interaction; Jul. 9-13, 2001; Tokyo, Japan; p. 263-9.

Smith Marc; Cadiz, J-J.; and Burkhalter, "Conversation Trees and Threaded Chats"; CSCW 2000 ACM 2000 Conference on Computer Supported Cooperative Work; Dec. 2-6, 2000; Philadelphia, PA; p. 97-105.

Raman, Bhaskaranj Katz, Randy H~ Joseph, Anthony D.; "Universal Inbox: Providing Extensible Personal Mobility and Service Mobility in an Integrated Communication Network"; Proceedings Third IEEE Workshop on Mobile Computing Systems and Applications; Dec. 7-8, 2000; Los Alamitos, CA; p. 95-106.

Hisino, Stacie and Mockus, Audris; "Handimessenger: Awareness-Enhanced Universal Communication for Mobile Users"; Human Computer Interaction with Mobile Devices 4th International Symposium, Mobile HCI 2002; Sep. 18-20, 2002; Pisa, Italy; p. 170-83.

Fong, A.C.M.; Hui, S.C.; and Lau, C.T.; "Towards an Open Protocol for Secure Online Presence Notification"; Computer Standards & Interfaces; Sep. 2001; vol. 23, No. 4; p. 311-324.

Klau, Rick; "Easy Instant Messaging"; Law Practice Management; Oct. 2002; vol. 28, No. 7; p. 8, 10, 12.

Callaghan, Dennis; and Neal, David; Enterprise Messaging Grows; IT Week; Nov. 25, 2002; vol. 5, No. 44; p. 28.

Office Action dated Oct. 3, 2007 cited in U.S. Appl. No. 10/683,800.

Notice of Allowance dated Jul. 9, 2008 cited in U.S. Appl. No. 10/683,800.

* cited by examiner

CONTACT SIDEBAR TILE

CROSS-REFERENCE TO RELATED APPLICATIONS

This application is a continuation of U.S. patent application Ser. No. 10/683,800 filed Oct. 10, 2003. The foregoing patent application is incorporated herein by reference in its entirety.

BACKGROUND OF THE INVENTION

1. The Field of the Invention

The present invention relates to real-time communication. More specifically, the present invention relates to a tracking application for real-time communication data from a plurality of diverse real-time communication providers.

2. Background and Related Art

Real-time communication or instant messaging ("IM") is becoming increasingly popular for commercial, leisure, and even military applications. By its nature, however, particularly in the commercial and leisure settings, real-time communication is generally one of several tasks being performed simultaneously. Accordingly, the relative importance of real-time communication with respect to other tasks is subject to change over time. One shortcoming of current real-time communication software is the inability to adjust to these changing priorities.

Real-time communication software generally shows some information about various users, such as whether a user is online and available for a real-time conversation, and allows a user to initiate real-time communication with others or accept notifications to join conversations initiated by others. Apart from the real-time communication window, there is no way to keep track of a user's real-time contacts so that the user is aware of the contacts' status and presence or to begin a real-time conversation. At times this creates difficulties for a user because like other windows, the real-time communication window and its contact information may be covered by other applications.

Another problem is that real-time communication information tends to be limited to individual service providers. For example, contact information and a contact's status or presence is shown only within a particular service provider's real-time communication window. As a result, if a user communicates with several contacts having different service providers, separate real-time communication windows must be open for each distinct service provider. Of course, needing several real-time communication windows to keep track of contacts, simply multiplies the difficulties identified above.

Currently, real-time communication windows also tend to be limited to providing only real-time communication information. Information about other forms of communication has been considered extraneous. For example, real-time communication windows have failed to integrate information about the number of unread e-mails a contact has sent. However, e-mail may be a fallback form of communicating with contacts when real-time communication is unavailable. Therefore, e-mail information may help provide continuity in communication when contacts are not currently online. Accordingly, improved methods, systems, and computer program products for tracking real-time communication data are desired.

BRIEF SUMMARY OF THE INVENTION

The present invention relates to methods, systems, and computer program products for tracking real-time communication data within a single contact tracking application. The contact tracking application can track real-time communication data for real-time communication that uses any of a plurality of diverse real-time communication providers and applications. In accordance with example embodiments, a global real-time communication data store is synchronized with real-time communication data from each of a plurality of diverse real-time communication applications corresponding to a plurality of diverse real-time communication providers. Real-time communication data corresponding to one or more contacts dynamically determined to be one or more recent contacts is retrieved from the global real-time communication data store. The recent contact determination is based on one or more properties associated with the real-time communication data. A user interface is generated for displaying the one or more recent contacts.

The one or more properties for dynamically determining that the one or more contacts are recent contacts may include, for example, a most recent communication time, a communication count, a weighted combination of most recent communication time and communication count, and the like. Real-time communication data corresponding to one or more contacts identified as pinned contacts for which display of the corresponding real-time communication data is preferred, also may be retrieved. A user interface also may be generated for displaying the one or more pinned contacts.

The user interface may include separated pinned contact and recent contact portions. Accordingly, the pinned contact portion and/or recent contact portion may vary in size based on the number of contacts identified as pinned contacts. The user interface may be subject to being dynamically resized by user input. Depending on the number of contacts and size of the user interface, only a portion of the pinned contacts and recent contact may be displayed. Pinned contacts may be ordered alphabetically to make them easier to find.

The real-time communication data for the pinned and recent contacts may include presence, status, unread messages, and unread notifications, even when the user interface includes a plurality of contacts from diverse service providers. This real-time communication data may be retrieved periodically from any of the diverse real-time communication applications or may be received automatically without the need for an explicit request. For example, any of the diverse real-time communication applications can update the global real-time communication data store at any time, with the updated real-time communication data then being reflected on the user interface as soon as it is available. The user interface also may include a text entry box for searching through the contacts and a link for adding a new contact. The user interface may receive user input to select a specific contact, select the specific contact, and initiate a real-time conversation, e-mail, etc., with the selected contact. Previously unpinned contacts may be pinned, and previously pinned contacts may be unpinned. A separate flyout user interface may be used for displaying all contacts.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for tracking real-time communication data for real-time communication using any of a plurality of diverse real-time communication providers or applications, all within a single tracking application. The embodiments of the present invention may comprise one or more special purpose and/or one or more general purpose computers including various computer hardware, as discussed in greater detail below.

Figure 1:
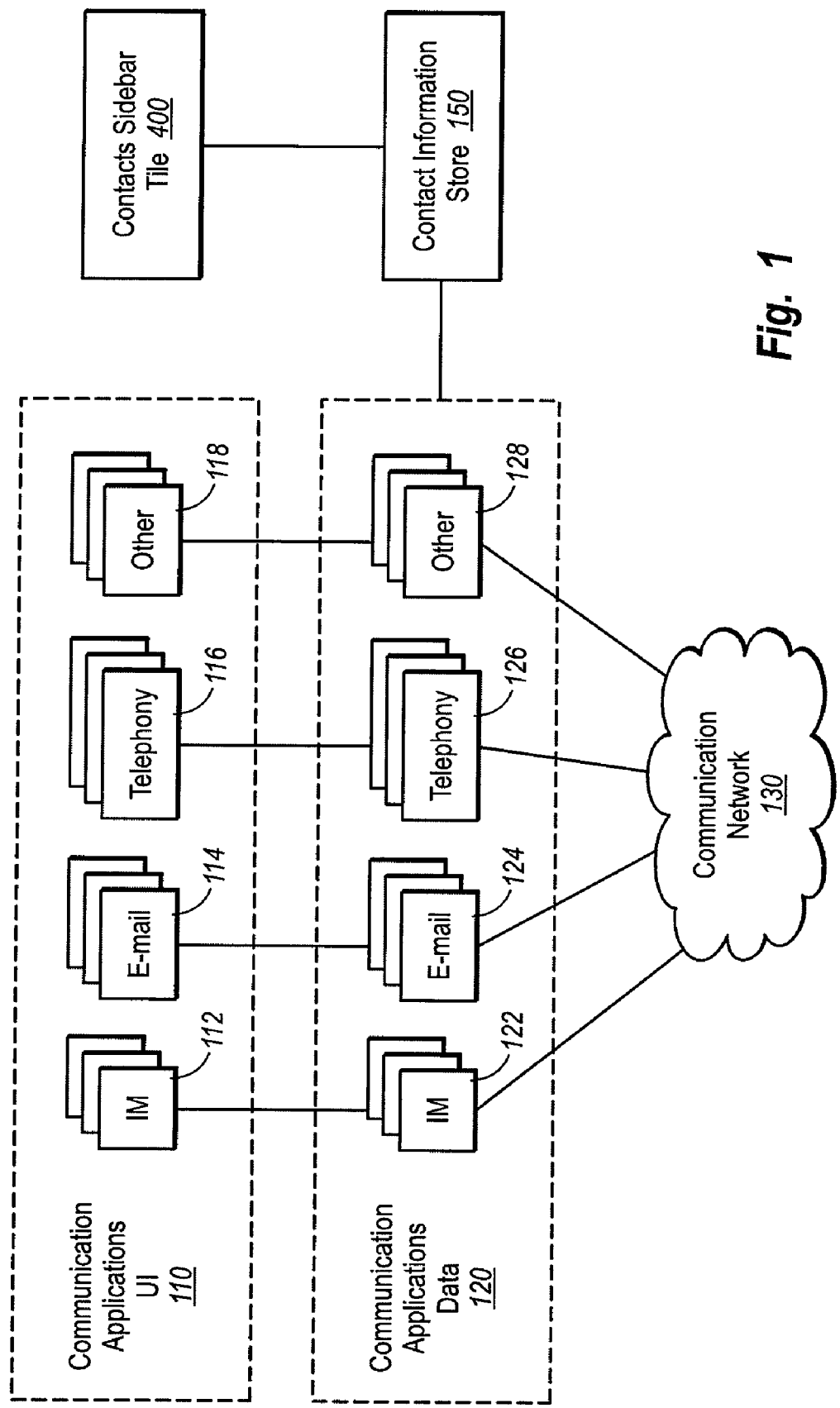
FIG. 1 shows an example architecture for a real-time communication data tracking application in accordance with the present invention.

FIG. 1 shows an example architecture for a real-time communication data tracking application in accordance with the present invention. A communication network 130, such as the Internet, provides for a variety of electronic communication between contacts. For example, communication applications user interfaces 110 are shown for instant messaging ("IM") or real-time communication 112, e-mail 114, telephony 116, and other 118. Each type of communication includes some form of communication applications data 120, including IM data 122, e-mail data 124, telephone data 126, and other data 128. This data may include the electronic communication itself or other data related to the electronic communication. For example, IM or real-time communication data 122 might include real-time contacts and presence or status information for the real-time contact, in addition to what ever data is communicated between contacts (e.g., text, audio, video, binary, and the like). E-mail data 124 may include e-mail contacts, received and sent e-mail messages, counts for unread messages, message date and size information, attachments, etc.

Contact information store 150 contains at least some of the communication applications data 120 for the various communication applications. Note that IM or real-time communication applications user interface 112 and communication applications data 120 show that several potentially diverse applications may be used for real-time communication. The same is true for e-mail, telephone, and other communication. As described in more detail below, contacts sidebar tile 400 displays real-time communication data that is stored within contact information store 150.

Note that contact information store 150 simplifies the operation of contacts sidebar tile 400. Some communication applications may choose to update the contact information store 150 automatically as communication applications data 120 changes through an interface (not shown) to the contact information store 150. Other applications may be incapable of automatically updating contact information store 150 or choose not to implement that functionality. Accordingly, contact information store 150 also may retrieve data from the communication applications data 120. Contact information store 150 and contact sidebar tile represent a single contact tracking application that tracks real-time communication data for a plurality of diverse real-time communication providers or applications. In some embodiments, this single contact tracking application may be part of or directly supported by an operating system within a computer system, such as the conventional computer described below in connection with FIG. 1.

Figure 2:
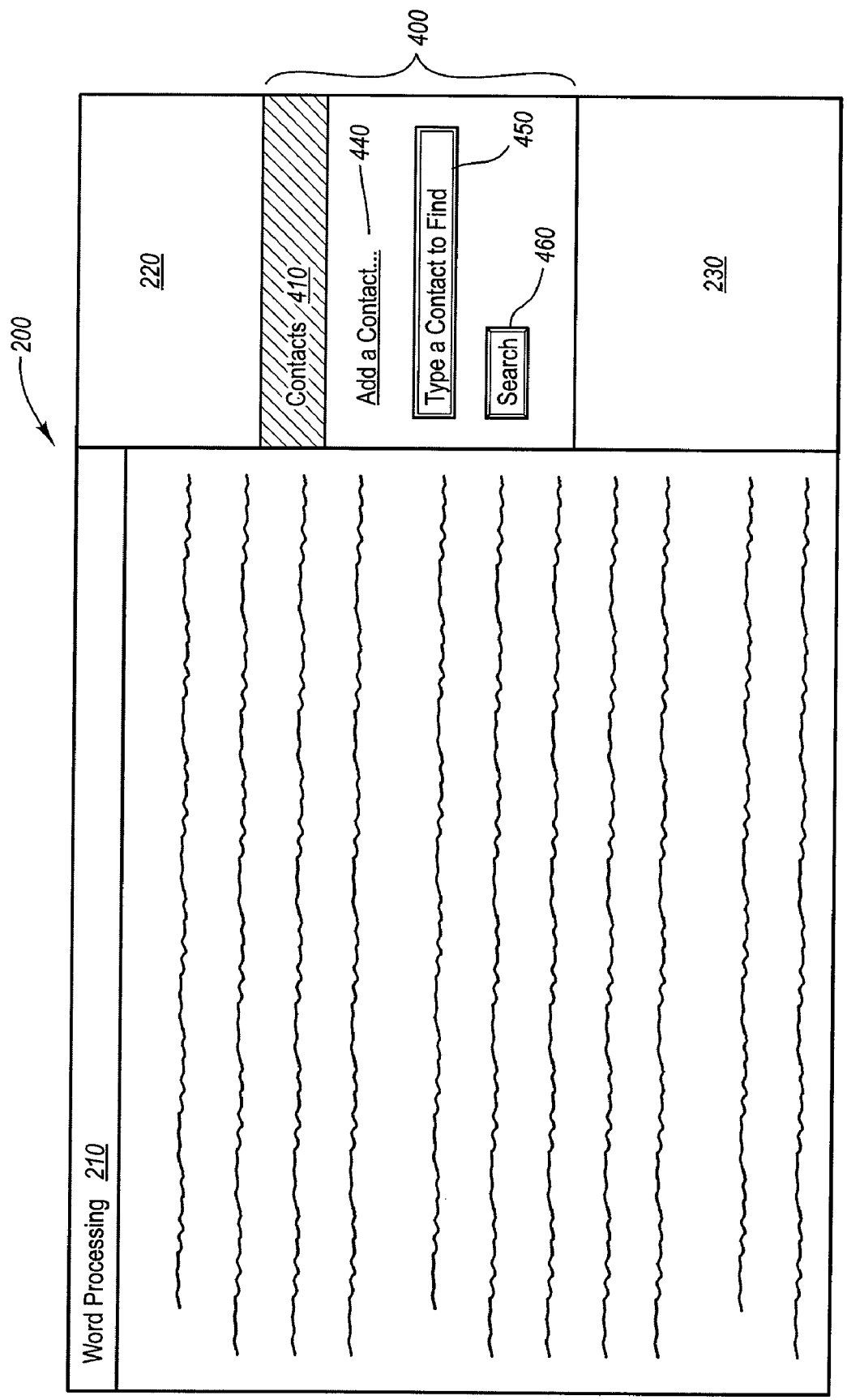
FIG. 2 illustrates the user interface for the example tracking architecture shown in FIG. 1, within the context of a desktop that also shows other user interface elements.

FIG. 2 illustrates the contacts sidebar tile 400 for the example tracking architecture shown in FIG. 1, within the context of a desktop 200 that also shows other user interface elements. For example, desktop 200 shows word processing application 210. The contact sidebar tile 400 is included as part of a side bar, with other user interface portions or tiles 220 and 230. The side bar and contact sidebar tile 400 can be displayed at all times in order to track real-time communication data while a user performs other tasks or operations.

Contact sidebar tile 400 includes a contacts header 410 and initially is empty. That is not to say that no real-time, e-mail, or other contacts are defined within communication applications data 120, but rather, as described in greater detail below, that none of the defined contacts meet the criteria for being displayed within the contact sidebar tile 400. Due to its purpose and limited size, contact sidebar tile 400 generally displays only a portion of all contacts. Accordingly, or now, contact sidebar tile 400 includes a link 440 to add a contact (e.g., a real-time contact, an e-mail contact, etc.) to communication applications data 120, a text box 450 for searching communication applications data 120 for an existing contact, and a search button 460 to initiate the search. The link 440 to add a contact may simply invoke an existing or external application to manage contacts within communication applications data 120.

Figure 3:
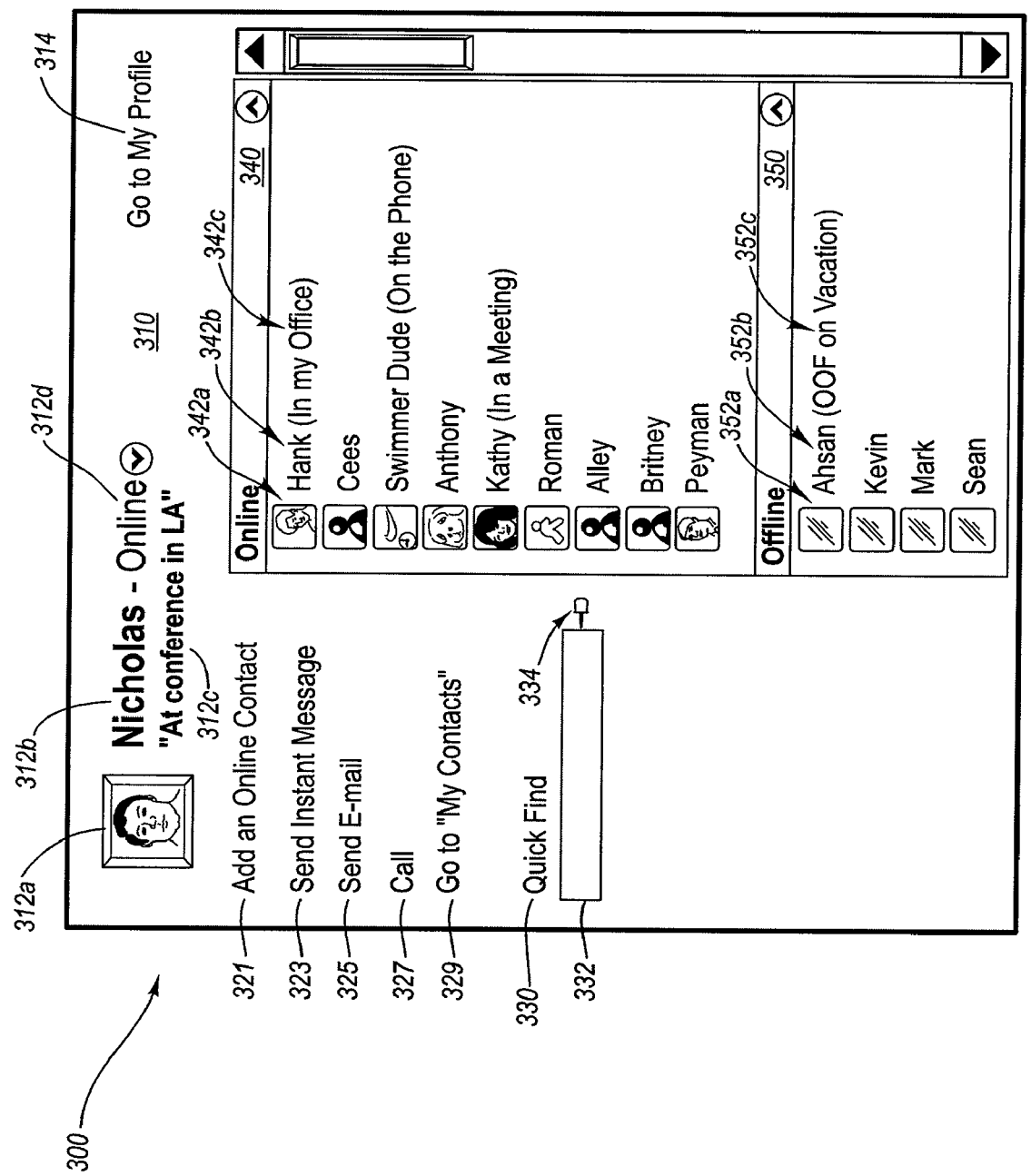
FIG. 3 show an example flyout user interface in accordance with the present invention for managing real-time and other contacts.

FIG. 3 show an example flyout user interface 300 managing real-time and other contacts used to display all contacts. User interface 300 is described as a flyout user interface because it is connected to and associated with contact sidebar tile 400, but is larger, and therefore capable of showing more detail than contact sidebar tile 400. User interface 300 is a heavier-weight user interface that is intended to support a wide range of user interaction. By comparison, contact sidebar tile 400 is lightweight and allows a user to be peripherally aware of real-time communication data for certain contacts of particular interest, without the space and complexity of user interface 300. When the lightweight interaction of the relatively simple contact sidebar tile 400 proves insufficient, the more complex features and larger size of user interface 300 may be invoked. For example, searching for a contact may display flyout user interface 300 with the contact that most nearly matches the search criteria highlighted. Of course, flyout user interface 300 may be accessed in a variety of ways, such as from a MyContacts selection that appears as an option in other user interface menus.

Flyout user interface 300 includes header 310 with personal information about the user, such as a graphic (picture, image, icon, etc.) representation 312a of the user, the user's online name 312b, the user's location/presence 312c, and status information 312d for the user. The "Go to My Profile" link 314 may be selected to change this personal information. Flyout user interface 300 also includes options to add an online contact 321, send an instant message 323, send e-mail 325, call a contact 327, go to a "My Contacts" folder 329, perform a quick find operation 330 for a contact entered into text box 332, and an option to pin 334 a contact to contact sidebar tile 400, as described in greater detail below with respect to FIG. 4.

Flyout user interface 300 organizes contact by status, such as online, offline, away, busy, unknown, etc. Online group 340 includes Hank, Cees, Swimmer Dude, Anthony, Kathy, Roman, Alley, Britney, and Peyman. Note that for each contact there is a corresponding graphic/icon 342a, a display name 342b, and location/presence information 342c. (Location/presence information 342c is often implemented as a custom or user defined status.) For example, Nicholas (the user) is at a conference in LA, Hank is in his office, Swimmer Dude is on the phone, and Kathy is in a meeting. Offline group 350 includes Ahsan, Kevin, Mark, and Sean. Ahsan is OOF (out of office) and therefore may be somewhat more difficult to reach for a time.

Figure 4:
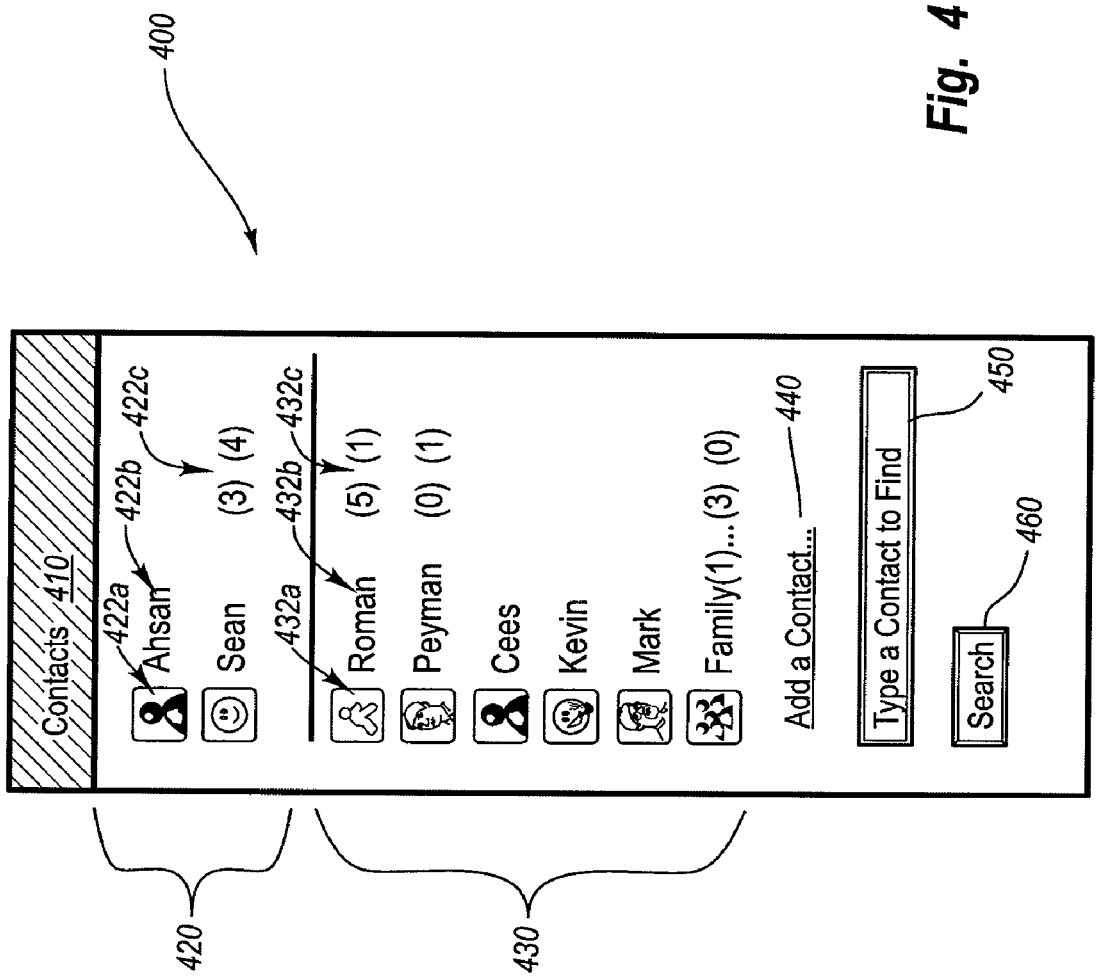
FIG. 4 illustrates the example user interface from FIG. 2, populated with both pinned and recent contacts in accordance with the present invention.

FIG. 4 illustrates the example contacts sidebar tile 400 from FIG. 2, populated with both pinned and recent contacts as described below. As before, contacts sidebar tile 400 includes a header 410 to identify the contents of the user interface, a link 440 to add a contact, a text box 450 for searching contacts, and a button 460 to initiate a search. Contacts sidebar tile 400 also includes a pinned contact section 420 and a recent contact section 430. Pinned contacts are contacts that the user has explicitly indicated should appear on contact sidebar tile 400. For example, a right-click, or the option to pin 334 a contact as shown in FIG. 3, or a drag/drop operation may be used to add a contact to the pinned contact section 420.

When a contact from communication applications data 120 is pinned, the contact is stored in contact information store 150 with any corresponding real-time communication data. Alternatively, contact information store 150 may include all contact from communication application data 120 and pinning simply adds a property or some other indication that identifies a contact as a pinned contact. In FIG. 4, Ahsan and Sean are pinned contacts. Each pinned contact includes certain real-time communication data, including a graphic/icon 422a, online name 422b, and an unread e-mail message/unread real-time communication notifications count 422c. For example, Sean has sent three e-mail messages to the user which have not been read and has been invited by the user to join four real-time conversations, with none of the invitations/notifications having been read by the user. Although not shown, custom location/presence (custom status) information also may be displayed here, such as if the contact currently is playing a game. Typically, pinned contact will be ordered alphabetically, but also may be ordered in the same manner described below for the recent contacts.

Recent contact section 430 shows contacts with whom the user has had recent real-time conversations. Whether a contact is a recent contact may be based on a variety of factors, including the time of the most recent real-time conversation, the number of real-time conversations, and the like. Weighting these factors may help improve the usefulness of the contact sidebar tile. For example, even though a large number of real-time conversations have occurred with a particular contact, if those conversations are relatively old, compared to other conversations with other contacts, preference should probably be given to the more recent conversations. However, when deciding which recent contacts to drop in favor of more recent contacts, frequency may be an important consideration. In some implementations, the determination may be based strictly on most recent real-time conversation.

Recent contact section 430 includes Roman, Peyman, Cees, Kevin, Mark, and Family. Family is a group of real-time contacts and the real-time communication data shown for family is an aggregate of the real-time communication data for each user. The number in parenthesis next to the group name indicates the number of real-time contacts in the group who are online. For the family group, one real-time contact is online. Similar to pinned contacts, real-time contacts show a graphic/icon 432a (also known as a user tile), online name 432b, and an unread e-mail message/unread real-time communication notifications count 432c. Hovering over a contact may display additional information, such as a display name, status, custom status, real-time communication address, real-time communication provider, e-mail address, etc. Of course, color and/or user tile display may be used to indicate status as well.

Although not shown in FIG. 4, the contacts sidebar tile 400 may contain any number of sections. For example, a section could be defined for contacts that are near, or ones that like to play games, or for certain co-workers. The criteria for each of the various sections may use predefined properties that are part of each contact or may be user-defined. Likewise, determining which contacts meet the criteria for a particular section may be based on predefined rules or rules that a user defines, such as through a script, a simple programming language, or for sophisticated users, a relatively complex programming language. Accordingly, an arbitrary number of sections may be present in contacts sidebar tile 400, depending on the needs and/or desires of a particular user.

Various forms of communication may be initiated from the contact sidebar tile. Right-clicking on a contact brings up a menu of operations that may be performed, such as begin a real-time conversation or begin an e-mail message. A user also may be presented with options to view the details page for the contact or to remove the contact from the contact sidebar tile.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 5A:
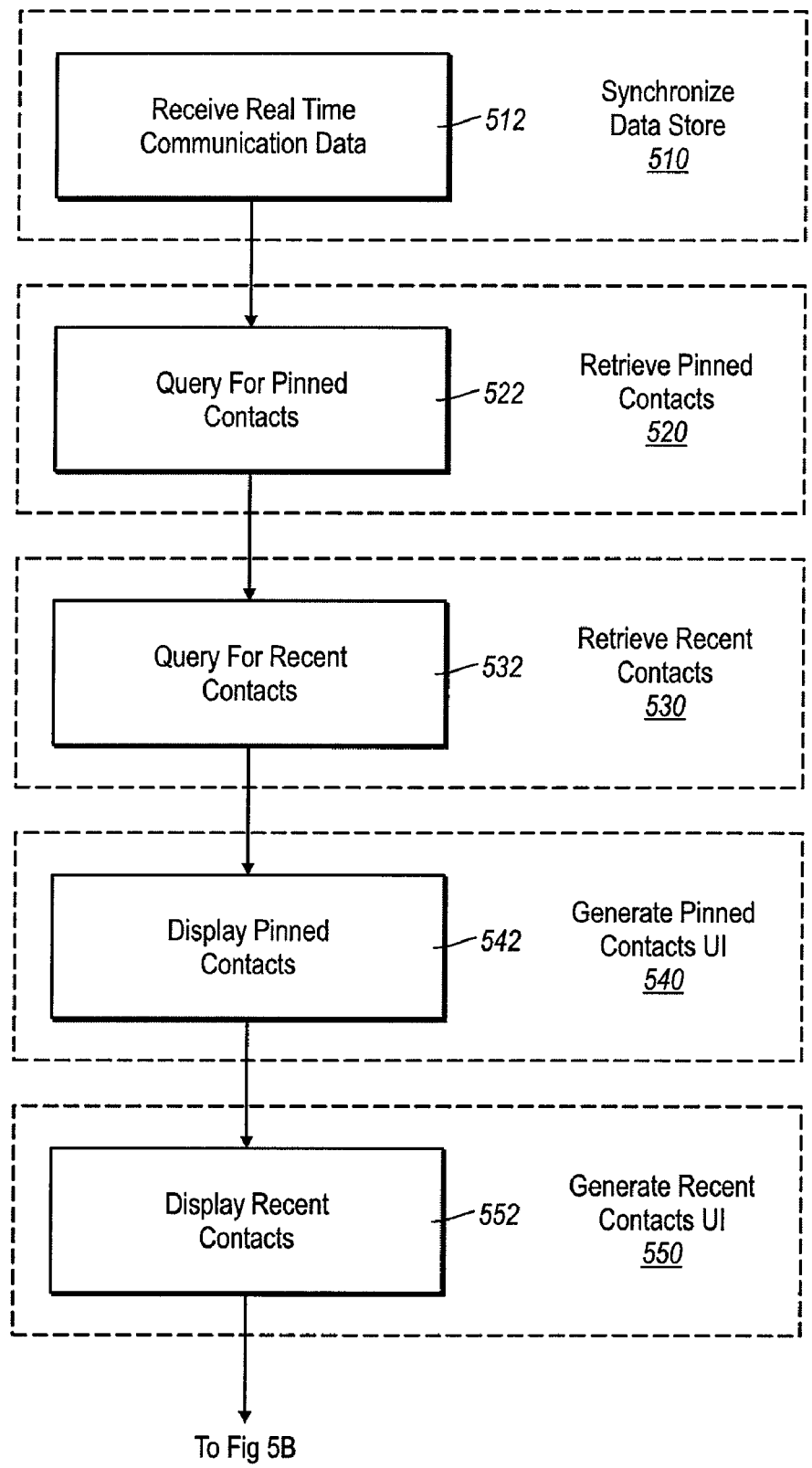
FIGS. 5A-5B show example acts and steps for methods of tracking real-time communication data in accordance with the present invention.
Figure 5B:
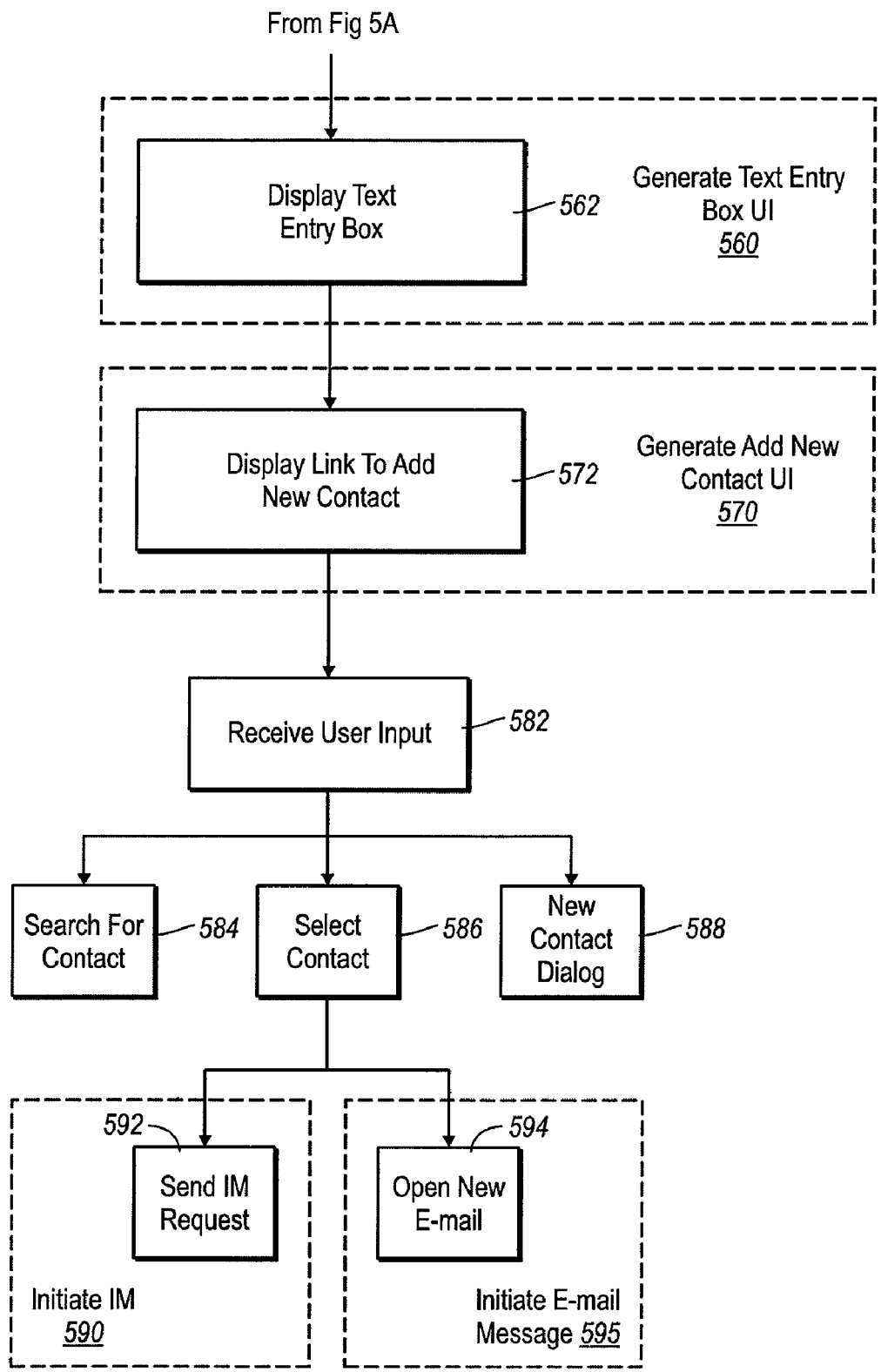

FIGS. 5A-5B show example acts and steps for methods of tracking real-time communication data in accordance with the present invention. Note that although the description below may appear to be sequential, example embodiments of the invention may perform the various processing acts and steps continuously, or in an on-going manner, so that the contact side bar tile 400 is always up-to-date. That is, current real-time communication data flows from communication applications 120 into the contact information store 150 and then to the contact side bar tile 400 for display. In this way, for example, the displayed real-time communication data, such as whether the contact is online or offline, the number of unread e-mail messages from the contact, etc., remains accurate over time.

A step for synchronizing (510) a global real-time communication data store with real-time communication data from each of a plurality of diverse real-time communication applications corresponding to a plurality of diverse real-time communication providers may include an act of receiving (512) the real-time communication data from each of the plurality of diverse real-time communication applications. A step for retrieving (520), from the global real-time communication data store, real-time communication data corresponding to one or more contacts identified as pinned contacts for which display of the corresponding real-time communication data is preferred may include an act of querying (522) the global real-time communication data store for the real-time communication data.

A step for retrieving (530), from the global real-time communication data store, real-time communication data corresponding to one or more contacts which are dynamically determined at the global real-time communication data store to be one or more recent contacts, based on one or more properties associated with the real-time communication data, may include an act of querying (532) the global real-time communication data store for the real-time communication data. A step for generating (540) a user interface for displaying the one or more pinned contacts may include an act of displaying (542) the one or more pinned contacts in a user interface generate by a contact tracking application. A step for generating (550) a user interface for displaying the one or more recent contacts may include an act of displaying (552) the one or more recent contacts in a user interface generated by the contact tracking application.

A step for generating (560) a text entry box on the user interface for searching for a contact may include an act of displaying (562) the text entry box. A step for generating (570) a link on the user interface for adding a new contact may include an act of displaying (572) the link. A step for pinning (not shown) a previous unpinned contact may include an act of receiving (not shown) an indication at the global real-time communication data store that a particular contact is a pinned contact and an act of updating (not shown) the use interface to include the particular contact as a pinned contact. A step for unpinning (not shown) a previously pinned contact may include an act of receiving (not shown) an indication at the global real-time communication data store that the particular contact is no longer a pinned contact and an act of updating (not shown) the user interface to remove the particular contact as a pinned contact. A step for generating (not shown) a separate flyout user interface for displaying all contacts may include an act of receiving (not shown) user input to display all contacts and an act of displaying (not shown) a separate flyout user interface for displaying all contact.

The method also may include acts of receiving (582) user input, and then based on that user input, searching (584) for a contact, selecting (586) a contact, or opening (588) a new contact dialog. A step for initiating (590) an instant message or real-time conversation may include an act of sending (592) an instant message or real-time conversation request to a selected contact. Similarly, a step for initiating (595) an e-mail message may include an act of opening (594) a new e-mail message for a selected contact.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 6:
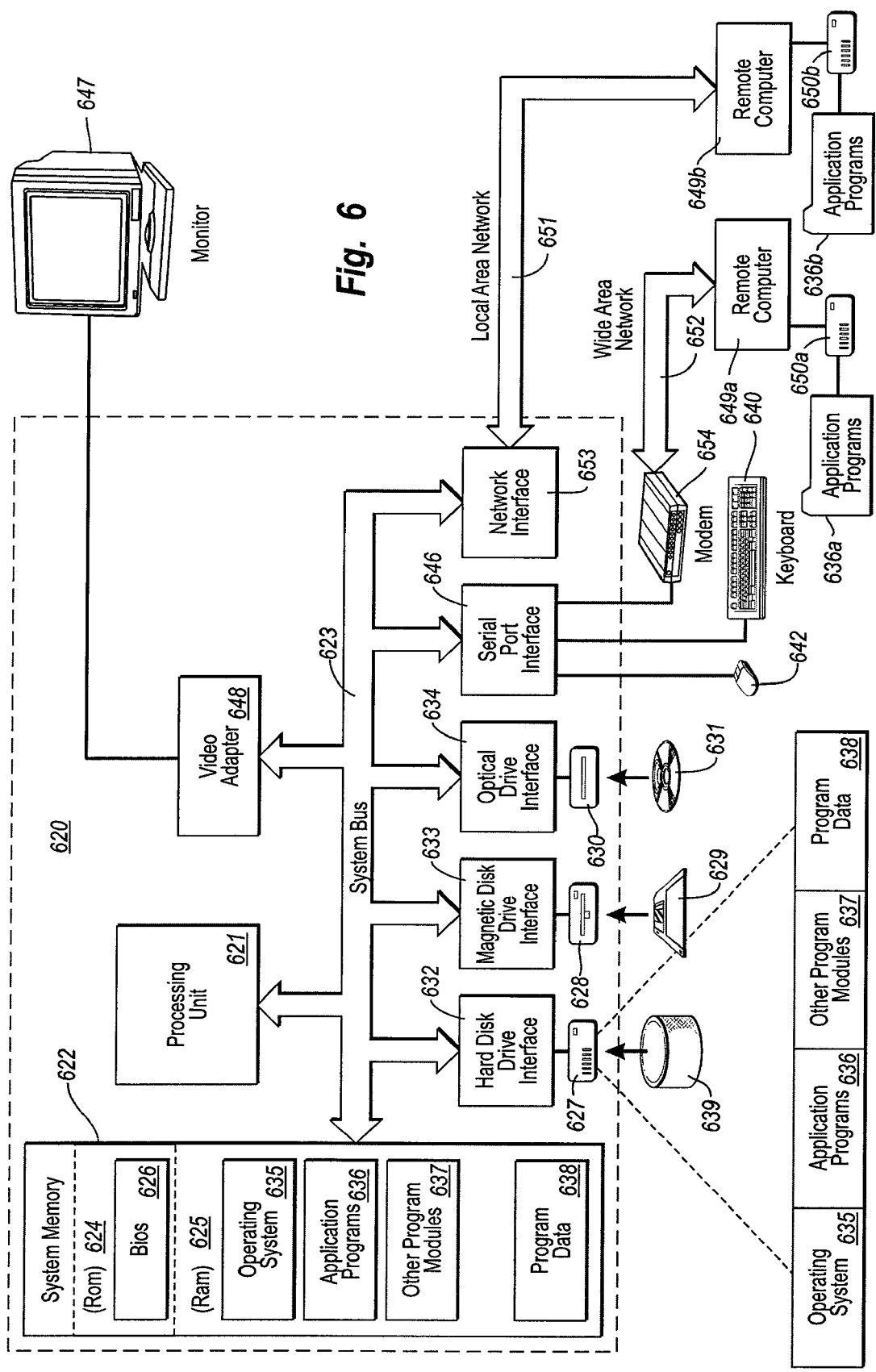
FIG. 6 illustrates an example system that provides a suitable operating environment for the present invention.

FIG. 6 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 6, an exemplary system for implementing the invention includes a general purpose computing device in the form of a conventional computer 620, including a processing unit 621, a system memory 622, and a system bus 623 that couples various system components including the system memory 622 to the processing unit 621. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that help transfer information between elements within the computer 620, such as during start-up, may be stored in ROM 624.

The computer 620 may also include a magnetic hard disk drive 627 for reading from and writing to a magnetic hard disk 639, a magnetic disk drive 628 for reading from or writing to a removable magnetic disk 629, and an optical disc drive 630 for reading from or writing to removable optical disc 631 such as a CD-ROM or other optical media. The magnetic hard disk drive 627, magnetic disk drive 628, and optical disc drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. Although the exemplary environment described herein employs a magnetic hard disk 639, a removable magnetic disk 629 and a removable optical disc 631, other types of computer readable media for storing data can be used, including magnetic cassettes, flash memory cards, digital versatile discs, Bernoulli cartridges, RAMs, ROMs, and the like.

Program code means comprising one or more program modules may be stored on the magnetic hard disk 639, removable magnetic disk 629, removable optical disc 631, ROM 624 or RAM 625, including an operating system 635, one or more application programs 636, other program modules 637, and program data 638. A user may enter commands and information into the computer 620 through keyboard 640, pointing device 642, or other input devices (not shown), such as a microphone, joy stick, game pad, satellite dish, scanner, or the like. These and other input devices are often connected to the processing unit 621 through a serial port interface 646 coupled to system bus 623. Alternatively, the input devices may be connected by other interfaces, such as a parallel port, a game port or a universal serial bus (USB). A monitor 647 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649a and 649b. Remote computers 649a and 649b may each be another personal computer, a server, a router, a network PC, a peer device or other common network node, and typically include many or all of the elements described above relative to the computer 620, although only memory storage devices 650a and 650b and their associated application programs 636a and 636b have been illustrated in FIG. 6. The logical connections depicted in FIG. 6 include a local area network (LAN) 651 and a wide area network (WAN) 652 that are presented here by way of example and not limitation. Such networking environments are commonplace in office-wide or enterprise-wide computer networks, intranets and the Internet.

When used in a LAN networking environment, the computer 620 is connected to the local network 651 through a network interface or adapter 653. When used in a WAN networking environment, the computer 620 may include a modem 654, a wireless link, or other means for establishing communications over the wide area network 652, such as the Internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a system that engages in real-time communication with one or more contacts at one or more other systems, a method of tracking real-time communication data, within a single contact tracking application that tracks real-time communication data for real-time communication using any of a plurality of diverse real-time communication providers and applications, the method comprising acts of:

querying a global real-time communication data store for synchronized real-time communication data and e-mail communication data which has been received by the global real-time communication data store from diverse communication providers and that correspond to one or more contacts that are dynamically determined at the global real-time communication data store to be one or more recent contacts of a user and based on one or more properties associated with the real-time or e-mail communication data, wherein each of the one or more recent contacts is a contact with whom the user has had a recent communication; and displaying the one or more recent contacts on a user interface in a listing that is generated by a contact tracking application, wherein a plurality of numbers is displayed next to at least one of the one or more recent contacts within the user interface, the plurality of numbers comprising quantities of unread e-mail messages and unread real-time communication notifications, respectively, that have been received from the corresponding contact, wherein the listing of the recent contacts has an ordering that is based on at least one of a most recent communication time, a communication count, or a weighted combination of the most recent communication time and the communication count, and wherein the listing of recent contacts is displayed separately from a listing of pinned contacts that the user has explicitly indicated to appear on the user interface.

2. The method as recited in claim 1, wherein the one or more properties comprise a most recent communication time for the one or more contacts, and wherein display of the one or more recent contacts is ordered on the user interface by most recent communication time.

3. The method as recited in claim 1, further comprising acts of:

querying the global real-time communication data store for real-time and e-mail communication data corresponding to one or more contacts identified as pinned contacts for which display of the corresponding real-time and e-mail communication data is preferred; and displaying at least one of the one or more pinned contacts on the user interface generated by the contact tracking application.

4. The method as recited in claim 3, wherein the user interface generated by the contact tracking application comprises separate pinned contact and recent contact portions.

5. The method as recited in claim 4, wherein the pinned contact user interface portion varies in size based on the number of one or more contacts identified as a pinned contact.

6. The method as recited in claim 3, wherein the real-time communication data corresponding to the one or more pinned contacts comprises presence.

7. The method as recited in claim 1, wherein the real-time communication data corresponding to the one or more contacts dynamically determined to be one or more recent contacts comprises status.

8. The method as recited in claim 1, further comprising an act of displaying a link on the user interface for adding a new contact.

9. The method as recited in claim 1, wherein the user interface displays a plurality of contacts from diverse service providers, the method further comprising acts of:
  receiving user input to select a specific contact;
  selecting the specific contact;
  receiving user input to begin a new real-time conversation with the specific contact; and
  sending a request for a new real-time conversation to the specific contact.

10. The method of claim 1, wherein the ordering of the listed recent contacts is based on the communication count.

11. The method of claim 1, wherein the ordering of the listed recent contacts is based on the combination of the most recent communication time and the communication count.

12. The method of claim 1, wherein the contacts included in the listing of pinned contacts are ordered differently than the ordering of the listed recent contacts.

13. The method recited in claim 12, wherein the contacts in the listing of pinned contacts are ordered alphabetically.

14. The method recited in claim 1, wherein at least one of the listed contacts is a group contact that corresponds to a plurality of different contacts.

15. A computer program product comprising one or more computer readable storage media having stored computer executable instructions that implement a method of tracking real-time communication data, the method comprising acts of:
  querying a global real-time communication data store for real-time communication data and e-mail communication data that the global real-time communication data store has received from diverse communication providers and that correspond to one or more contacts that are dynamically determined at the global real-time communication data store to be one or more recent contacts of a user and based on one or more properties associated with the real-time or e-mail communication data, wherein each of the one or more recent contacts is a contact with whom the user has had a recent communication; and
  displaying the one or more recent contacts on a user interface in a listing that is generated by a contact tracking application, wherein a plurality of numbers is displayed next to at least one of the one or more recent contacts within the user interface, the plurality of numbers comprising quantities of unread e-mail messages and unread real-time communication notifications, respectively, that have been received from the corresponding contact, wherein the listing of the recent contacts has an ordering that is based on at least one of a most recent communication time, a communication count, or a weighted combination of the most recent communication time and the communication count, and wherein the listing of recent contacts is displayed separately from a listing of pinned contacts that the user has explicitly indicated to appear on the user interface.

16. The computer program product as recited in claim 15, wherein the one or more properties comprise a communication count for the one or more contacts, and wherein display of the one or more recent contacts is ordered on the user interface by communication count.

17. The computer program product as recited in claim 15, the method further comprising acts of:
  querying the global real-time communication data store for real-time and e-mail communication data corresponding to one or more contacts identified as pinned contacts for which display of the corresponding real-time or e-mail communication data is preferred; and
  displaying at least one of the one or more pinned contacts on the user interface generated by the contact tracking application.

18. The computer program product as recited in claim 17, wherein the user interface generated by the contact tracking application comprises separate pinned contact and recent contact portions.

19. The computer program product as recited in claim 18, wherein the recent contact user interface portion varies in size based the number of one or more contacts identified as a pinned contact.

20. The computer program product as recited in claim 17, wherein the real-time communication data corresponding to the one or more pinned contacts comprises status.

21. The computer program product as recited in claim 15, wherein the real-time and e-mail communication data corresponding to the one or more contacts dynamically determined to be one or more recent contacts comprises unread messages.

22. The computer program product as recited in claim 15, the method further comprising an act of displaying a text entry box on the user interface for searching for a contact.

23. The computer program product as recited in claim 15, the method further comprising an act of periodically requesting real-time communication data from at least one of the plurality of diverse real-time communication applications.

24. The computer program product as recited in claim 15, wherein the global real-time communication data store automatically receives real-time communication data from at least one of the plurality of diverse real-time communication applications, without having to make a request.

25. The computer program product as recited in claim 15, wherein the user interface displays a plurality of contacts from diverse service providers, the method further comprising acts of:
  receiving user input to select a specific contact;
  selecting the specific contact;
  receiving user input to begin a new e-mail message for the specific contact; and
  opening a new e-mail message for the specific contact.

26. The computer program product as recited in claim 15, wherein a particular contact is displayed on the user interface as a pinned contact, the method further comprising acts of:
  receiving an indication at the global real-time communication data store that the particular contact is no longer a pinned contact; and
  updating the user interface to remove the particular contact as a pinned contact.

27. The computer program product as recited in claim 15, the method further comprising acts of:
  receiving user input to display all contacts; and
  displaying a separate fly out user interface for displaying all contacts.

28. In a system comprising a global real-time communication data store, a method of tracking real-time communication data received from a plurality of diverse real-time communication providers, the method comprising acts of:

the global real-time communication data store synchronizing real-time communication data received from each of a plurality of diverse real-time communication applications corresponding to a plurality of diverse real-time communication providers and e-mail communication data received from each of a plurality of diverse e-mail communication providers; and the global real-time communication data store providing, at request, information comprising real-time communication data and e-mail communication data corresponding to one or more contacts that are dynamically determined at the global real-time communication data store to be one or more recent contacts of a user and based on one or more properties associated with the real-time or e-mail communication data, wherein each of the one or more recent contacts is a contact with whom the user has had a recent communication, and wherein the information is used to display the one or more recent contacts on a user interface in a listing that is generated by a contact tracking application, wherein a plurality of numbers is displayed next to at least one of the one or more recent contacts within the user interface, the plurality of numbers comprising quantities of unread e-mail messages and unread real-time communication notifications, respectively, that have been received from the corresponding contact, wherein the listing of the recent contacts has an ordering that is based on at least one of a most recent communication time, a communication count, or a weighted combination of the most recent communication time and the communication count, and wherein the listing of recent contacts is displayed separately from a listing of pinned contacts that the user has explicitly indicated to appear on the user interface.

* * * * *